(12) United States Patent
Hagelskamp et al.

(10) Patent No.: US 7,497,799 B2
(45) Date of Patent: Mar. 3, 2009

(54) TORQUE TRANSMITTING MECHANISM ENGAGEMENT CONTROL SYSTEM AND METHOD

(75) Inventors: Bryan H. Hagelskamp, Carmel, IN (US); Jeffrey E Shultz, Zionsville, IN (US)

(73) Assignee: General Motors Corporation, Detroit, MI (US)

( * ) Notice: Subject to any disclaimer, the term of this patent is extended or adjusted under 35 U.S.C. 154(b) by 449 days.

(21) Appl. No.: 11/341,203

(22) Filed: Jan. 27, 2006

(65) Prior Publication Data

US 2007/0179019 A1 Aug. 2, 2007

(51) Int. Cl.
*F16H 61/06* (2006.01)
(52) U.S. Cl. .................. 475/128; 477/143; 477/155
(58) Field of Classification Search ............ 475/128; 477/155
See application file for complete search history.

(56) References Cited

U.S. PATENT DOCUMENTS

| | | | |
|---|---|---|---|
| 4,070,927 A | 1/1978 | Polak | 74/765 |
| 4,707,789 A | 11/1987 | Downs et al. | 364/424.1 |
| 5,113,720 A * | 5/1992 | Asayama et al. | 74/335 |
| 5,216,606 A | 6/1993 | Lentz et al. | 364/424.1 |
| 5,588,327 A * | 12/1996 | Downs et al. | 74/335 |
| 5,601,506 A | 2/1997 | Long et al. | 475/120 |
| 6,285,942 B1 | 9/2001 | Steinmetz et al. | 701/67 |
| 6,346,063 B1 * | 2/2002 | Kondo et al. | 477/143 |
| 6,390,949 B1 * | 5/2002 | Kondo et al. | 477/143 |
| 6,503,165 B1 * | 1/2003 | Kubo et al. | 475/125 |
| 2004/0092365 A1 * | 5/2004 | Kwon et al. | 477/143 |

* cited by examiner

*Primary Examiner*—Sherry Estremsky

(57) ABSTRACT

A control system operable to engage a torque transmitting mechanism, the control system having at least one variable bleed solenoid valve operable to selectively provide pressurized fluid to selectively engage at least one torque transmitting mechanism. An electronic control unit is also provided to provide control to the at least one variable bleed solenoid valve. The electronic control unit commands the variable bleed solenoid valve to provide the pressurized fluid to the at least one torque transmitting mechanism for a first predetermined time and to subsequently substantially disallow the pressurized fluid to the at least one torque transmitting mechanism for a second predetermined time subsequent to the first predetermined time. The electronic control unit subsequently commands an intermediate pressure level to trim the torque transmitting mechanism into engagement. A method for providing engagement to the torque transmitting mechanism is also provided.

8 Claims, 3 Drawing Sheets

TORQUE TRANSMITTING MECHANISM ENGAGEMENT CONTROL SYSTEM AND METHOD

TECHNICAL FIELD

The present invention relates to a control system and method of torque transmitting mechanism engagement for an automatically shiftable transmission.

BACKGROUND OF THE INVENTION

In general, automatically shiftable transmissions include a number of gear elements and selectively engageable friction elements (referred to herein as torque transmitting mechanisms) that are controlled to establish one of several forward speed ratios between an input shaft and an output shaft of the transmission. The input shaft is coupled to an engine through a fluid coupling such as a torque converter, and the output shaft is coupled to the drive wheels of the vehicle through a differential gearset.

Shifting from a currently established speed ratio to new speed ratio involves, in most cases, disengaging a torque transmitting mechanism (off-going torque transmitting mechanism) associated with the current speed ratio and engaging a torque transmitting mechanism (on-coming torque transmitting mechanism) associated with the new speed ratio. Each such shift includes a preparation or fill phase during which an apply chamber of the on-coming torque transmitting mechanism is filled with pressurized fluid in preparation for torque transmission. Once filled to a predetermined amount, the fluid pressure supplied to the torque transmitting mechanism is lowered to allow smooth torque transmitting mechanism engagement.

Typically, the fill phase is carried out by commanding a maximum on-coming torque transmitting mechanism pressure for an empirically determined fill time. See, for example, the U.S. Pat. No. 4,707,789 to Downs et al., issued on Nov. 17, 1987, and assigned to the assignee of the present invention and hereby incorporated by reference in its entirety. In Downs et al., the fill time for any given torque transmitting mechanism is obtained from a look-up table as a function of the commanded fill pressure, less the torque transmitting mechanism return spring pressure, and then adjusted as a function of fluid temperature to compensate for variations in fluid viscosity. In operation, the stored fill times are then adaptively adjusted based on the observed inertia phase delay, in order to compensate for sources of error that influence the fill time. A similar approach is found in the U.S. Pat. No. 5,216,606 to Lentz et al., issued on Jun. 1, 1993, and assigned to the assignee of the present invention and hereby incorporated by reference in its entirety. In Lentz et al., the fill time is determined by table look-up based on the pump speed, as compensated for efficiency and fluid viscosity, and further modified based on the time since the last shift and a hydraulic restriction factor.

Traditional torque transmitting mechanism engagement methods provide a trim phase subsequent to the fill phase to allow smooth engagement and enhance shift quality. The trim phase provides a steady increase in torque transmitting mechanism apply pressure to the on-coming torque transmitting mechanism. Pressure variations or control system instability during the trim phase may cause poor shift quality.

SUMMARY OF THE INVENTION

Provided is an electro-hydraulic control system for an automatically shiftable transmission comprising at least one variable bleed solenoid valve operable to selectively provide pressurized fluid to selectively engage at least one torque transmitting mechanism. Also provided is an electronic control unit operable to control the variable bleed solenoid valve. The electronic control unit is sufficiently programmed to control the variable bleed solenoid to provide the pressurized fluid at a high pressure level to the torque transmitting mechanism for a first predetermined time. Subsequently, the electronic control unit will command the variable bleed solenoid valve to substantially disallow the pressurized fluid to the torque transmitting mechanism for a second predetermined time subsequent to the first predetermined time.

The variable bleed solenoid may modulate at least one pressure regulator valve operable to selectively and variably provide the pressurized fluid to selectively engage the torque transmitting mechanism. The control unit may be sufficiently programmed to further control the variable bleed solenoid to provide the pressurized fluid, at a lower pressure level, to the torque transmitting mechanism for a third predetermined time subsequent to the second predetermined time.

Also provided is a method of controlling an automatically shiftable transmission having a hydraulically actuated fillable torque transmitting mechanism. The method includes providing at least one variable bleed solenoid valve operable to selectively provide pressurized fluid to selectively engage the hydraulically actuated fillable torque transmitting mechanism. The variable bleed solenoid valve is commanded to deliver a maximum pressure value for a first predetermined time to substantially fill the hydraulically actuated fillable torque transmitting mechanism. Subsequently, the variable bleed solenoid valve is commanded to a minimum pressure value for a second predetermined time. Finally, the variable bleed solenoid valve is commanded to an intermediate pressure value for a third predetermined time to trim the hydraulically actuated fillable torque transmitting mechanism into engagement.

The method may further include commanding the variable bleed solenoid valve to a maximum pressure value subsequent to the third predetermined time to fully engage the hydraulically actuated fillable torque transmitting mechanism. Also, the method may include providing a main source of pressurized fluid and determining a time required to stabilize the main source of pressurized fluid after the first predetermined time. Thereafter, the time required to stabilize the main source of pressurized fluid is substantially equated to the second predetermined time.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

The present invention is described in the context of a multi-ratio automatically shiftable transmission having planetary gearsets of the type described in the U.S. Pat. No. 4,070,927 to Polak, and having an electro-hydraulic control system of the type described in U.S. Pat. No. 5,601,506 to Long et. al., both of which are hereby incorporated by reference in their entirety. Accordingly, the gearset and control elements shown in FIG. 1 hereof have been greatly simplified and further information regarding structure and operation may be found in the aforementioned patents. Additionally, the transmission and electro-hydraulic control system is only exemplary in nature and those skilled in the art will recognize that the ideas embodied by the present invention may be applied to other such systems.

Figure 1:
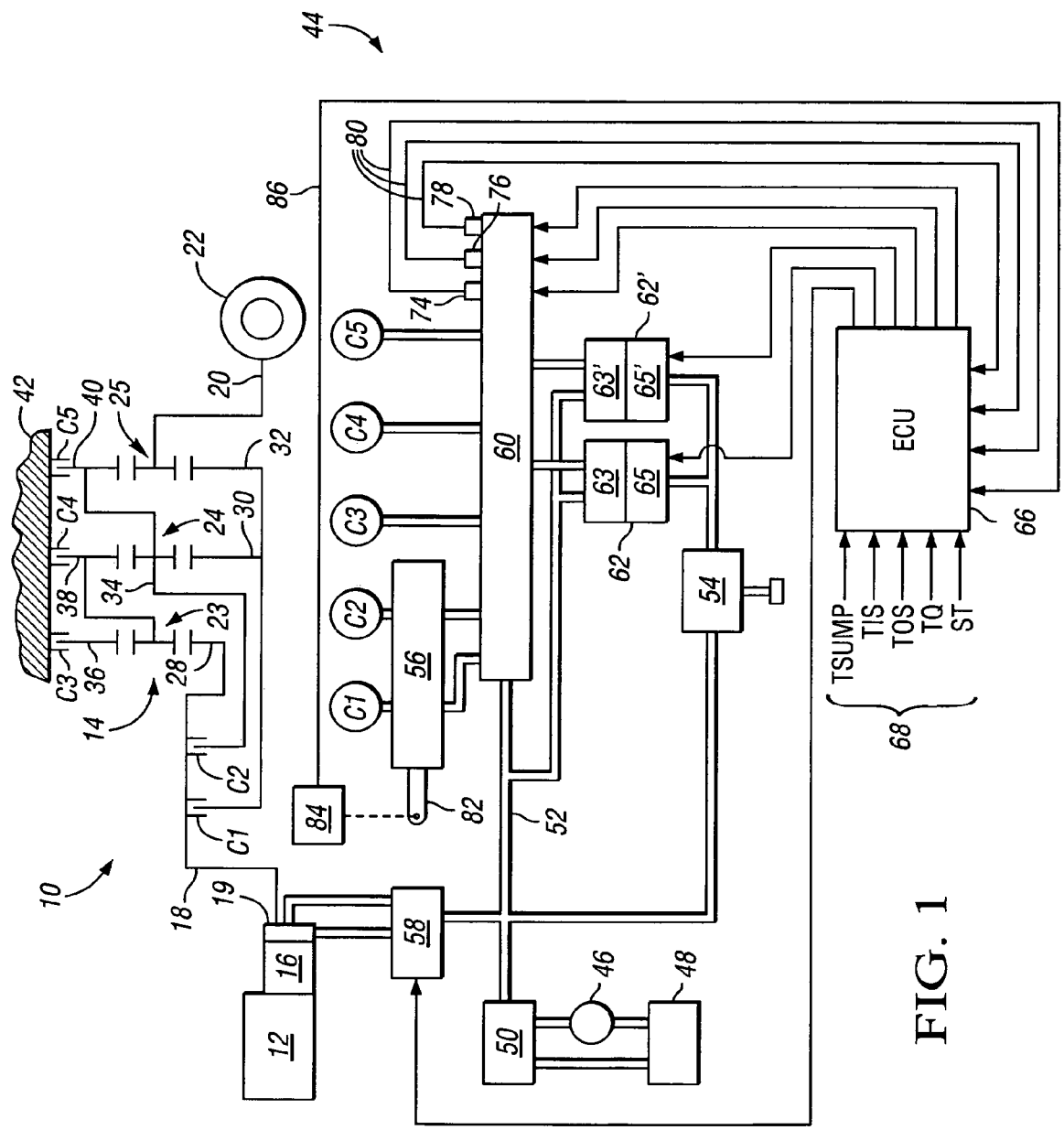
FIG. 1 is a schematic diagrammatic view of a vehicular powertrain showing an exemplary automatically shiftable transmission and electro-hydraulic control system of the present invention.

Referring to FIG. 1, the reference numeral 10 generally designates a vehicular powertrain including engine 12, automatically shiftable transmission 14, and a torque converter 16. The torque converter 16 provides a fluid coupling between the engine 12 and an input shaft 18 of the transmission 14. A torque converter clutch 19 is selectively engageable thereby providing a mechanical coupling for substantially unitary rotation between the engine 12 and the input shaft 18. An output shaft 20, of the transmission 14, can transmit torque to the drive wheels of the vehicle in one of several ways. The illustrated embodiment depicts a rear wheel drive (RWD) application in which the output shaft 20 is connected to a final drive or differential gearset 22.

The transmission 14 has three inter-connected planetary gearsets, designated generally by the reference numerals 23, 24 and 25. The input shaft 18 continuously drives a sun gear 28 of gearset 23, selectively drives the sun gears 30 and 32 of gearsets 24 and 25 via torque transmitting mechanism C1, and selectively drives the carrier 34 of gearset 24 via torque transmitting mechanism C2. The ring gears 36, 38, and 40 of gearsets 23, 24, and 25 are selectively grounded to a transmission case or housing 42 via torque transmitting mechanisms C3, C4 and C5, respectively.

The state of the torque transmitting mechanisms C1, C2, C3, C4, and C5, or C1-C5, (i.e., engaged or disengaged) can be controlled to provide six forward speed ratios, a reverse speed ratio, and a neutral condition. The first forward speed ratio is achieved by engaging torque transmitting mechanisms C1 and C5. The second forward speed ratio is achieved by engaging torque transmitting mechanisms C1 and C4. The third forward speed ratio is achieved by engaging torque transmitting mechanisms C1 and C3. The fourth forward speed ratio is achieved by engaging torque transmitting mechanisms C1 and C2. The fifth forward speed ratio is achieved by engaging torque transmitting mechanisms C2 and C3. The sixth forward speed ratio is achieved by engaging torque transmitting mechanisms C2 and C4. Additionally, the reverse speed ratio is achieved by engaging torque transmitting mechanisms C3 and C5, while the neutral condition is achieved by engaging only the C5 torque transmitting mechanism. Shifting from one forward speed ratio to another is generally achieved by disengaging one torque transmitting mechanism (referred to as the off-going torque transmitting mechanism) while engaging another torque transmitting mechanism (referred to as the on-coming torque transmitting mechanism). For example, the transmission 14 is shifted from the first forward speed ratio to the second forward speed ratio by disengaging the torque transmitting mechanism C5 while engaging the torque transmitting mechanism C4.

The selective engagement of the torque converter clutch 19 and the torque transmitting mechanisms C1-C5 is controlled by an electro-hydraulic control system, generally designated by the reference numeral 44. The hydraulic portion of the electro-hydraulic control system 44 includes a hydraulic positive displacement pump 46, which draws hydraulic fluid from a reservoir 48. Also provided is a pressure regulator valve 50, which returns a portion of the pressurized fluid exiting the pump 46 to the reservoir 48 thereby establishing a regulated pressure or main pressure in passage 52 to provide a control pressure. A secondary pressure regulator valve 54 further regulates the main pressure within the passage 52. A manual valve 56 is manipulated by the operator of the vehicle when shifting or selecting transmission ranges. A solenoid valve 58 such as a variable bleed solenoid valve, or VBS valve, operates to modulate the flow of pressurized fluid to the torque converter clutch 19 thereby selectively engaging and disengaging the torque converter clutch 19.

A set of three relay valves selectively operated by on/off type solenoid valves, represented in FIG. 1 as the consolidated block 60, are utilized in concert with the manual valve 56 to enable controlled engagement and disengagement of each of the torque transmitting mechanisms C1-C5 through the use of only two trim valve assemblies 62 and 62'. For a selected ratio, a particular combination of relay valves within the consolidated block 60 is selectively coupled to one of the trim valve assemblies 62 and 62' to effect the engagement of the on-coming torque transmitting mechanism, and the other of the trim valve assemblies 62 and 62' to effect the disengagement of the off-going torque transmitting mechanism.

The trim valve assemblies 62 and 62' each comprise a pressure regulator valve 63 and 63', respectively, which are biased by a variable pilot pressure that is developed by a respective variable bleed solenoid, or VBS, valve 65 and 65'. An electronic control unit, or ECU 66, determines pressure requirements for smoothly engaging the on-coming torque transmitting mechanism while smoothly disengaging the off-going torque transmitting mechanism to shift from one speed ratio to another. The ECU 66 subsequently develops the corresponding commanded pressure signals, and then supplies the signal to the respective VBS valves 65 and 65'.

The electronic portion of the control is primarily embodied by the ECU, 66. The ECU 66 is microprocessor-based in architecture. The ECU 66 controls the electro-hydraulic control system 44 based on a number of inputs 68 to achieve a desired transmission speed ratio. The inputs 68 may include, for example, signals representing the transmission input speed TIS, a driver torque command TQ, the transmission output speed TOS, and the hydraulic fluid temperature Tsump. Sensors for developing such signals are known to those skilled in the art and have been omitted for simplicity. The ECU 66 can be programmed based on either or both experimental and modeling results, to perform the functions set forth in detail below.

The relay valves within the consolidated block 60 are provided with pressure switches 74, 76, 78 for supplying diagnostic signals to the ECU 66 over a plurality of conductors or leads 80 based on the respective relay valve positions. The ECU 66, in turn, monitors the various diagnostic signals for the purpose of electrically verifying proper operation of the controlled elements. A control lever 82 of the manual valve 56 is coupled to a sensor and display module 84 that produces a diagnostic signal on a conductor or lead 86 based on the position of the control lever 82. Such a diagnostic signal is typically referred to as a PRNDL signal, since it indicates which of the transmission ranges (P—Park, R—Reverse, N—Neutral, D—Drive, or L—Low) has been selected by the operator.

The VBS valves 65 and 65' are a closed end type, and operate to provide a variable pressure signal to the respective pressure regulator valve 63 and 63' by bleeding off the control pressure supplied by the secondary pressure regulator valve 54 to obtain the required output pressure. The VBS valves 65 and 65' provide precise pressure control, provided the control pressure from the secondary pressure regulator valve 54 remains above a threshold level. If the control pressure from the secondary pressure regulator valve 54 drops too low, the VBS valve 65, 65' will not be able to maintain the output pressure or on-coming pressure as commanded by the ECU 66. The output pressure will vary depending on whether the VBS valve 65, 65' is outputting a high or a low level of output pressure. If the VBS valve 65, 65' is outputting a high level of output pressure, a decrease in the control pressure from the secondary pressure regulator valve 54 will cause the output pressure to decrease. Alternately, if the VBS valve 65, 65' is outputting a low output pressure, the drop in control pressure will cause the output pressure to increase. This instability at low control pressures may cause poor shift quality. Because of the mechanical characteristics of the closed ended VBS valves 65 and 65', the drop in the control pressure may cause the VBS valves 65 and 65' to leak fluid when commanded to a hydraulically off condition thereby further exacerbating the drop in control pressure.

As indicated above, each shift from one speed ratio to another includes a preparation or fill phase during which an apply chamber of the on-coming torque transmitting mechanism is filled to a predetermined value with fluid in preparation for torque transmission. Once the fill phase is complete, a trim phase initiates where the commanded pressure is lowered to an intermediate value to allow precise control of the pressurized fluid supplied to the apply chamber for engagement torque transmitting mechanism. The pressurized fluid compresses an internal return spring of the torque transmitting mechanism and strokes a piston to contact the torque transmitting mechanism plates, developing torque capacity beyond the initial return spring pressure. Thereafter, the apply phase begins wherein maximum commanded pressure is requested allowing full engagement of the torque transmitting mechanism.

A typical control strategy for engagement of the torque transmitting mechanism involves commanding a maximum on-coming torque transmitting mechanism pressure for an empirically determined fill time, and then proceeding with the subsequent phases of the shift. See, for example, the aforementioned U.S. Pat. Nos. 4,707,789 and 5,216,606. These patents recognize that the fill time for a given shift can change depending on various factors.

The fill phase is the portion of the torque transmitting mechanism engagement strategy that requires the greatest amount of fluid. If fill phase occurs when the engine 12 is operating at a low rotational speed and the fluid within the transmission 14 is warm, the fill phase may cause the line pressure or main pressure within passage 52 and the control pressure supplied by the secondary pressure regulator valve 54 to decrease. Accordingly, the one VBS valve 65 and 65' that is commanded to be hydraulically off may begin leaking and cause the VBS valve 65 and 65' that is commanded hydraulically on to output a higher control pressure than commanded. Once the VBS valve 65 and 65' that is commanded hydraulically off begins to leak, the main pressure and control pressure will decrease even further, thereby causing the leakage of the hydraulically off VBS valve 65 and 65' to further increase. The control pressure circuit to the VBS valves 65 and 65' may also include an orifice, not shown, for system stability. Once the leakage of the hydraulically off VBS valve 65 and 65' becomes sufficiently large, the fluid flowing out of the control pressure circuit may be greater than the fluid flowing into the control pressure circuit.

Figure 2:
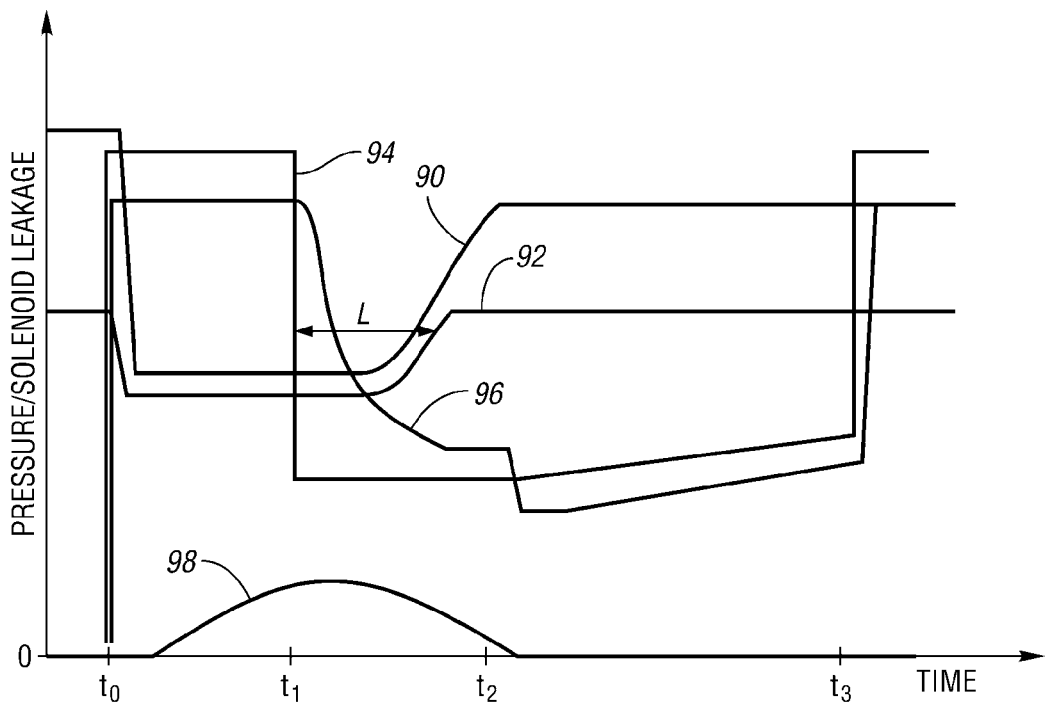
FIG. 2 is graphical representation of a typical on-coming torque transmitting mechanism engagement control strategy.

FIG. 2 is a graphical representation of a typical a torque transmitting mechanism engagement strategy. FIG. 2 can best be understood with reference to FIG. 1. The curve 90 represents the line pressure or main pressure within the passage 52. The curve 92 represents the control pressure exiting the secondary pressure regulator valve 54 and supplied to the VBS valves 65 and 65'. The curve 94 represents the commanded pressure value signal provided by the ECU 66 for engagement of the torque transmitting mechanism. While the curve 96 represents the fluid pressure within the on-coming torque transmitting mechanism, commonly referred to as the output pressure or on-coming pressure. The curve 98 represents the leakage value of the VBS valves that are commanded "off" within the control system 44. At a time equal to $t_0$, the fill phase initiates and the ECU 66 commands one of the VBS valves 65 or 65' to command full pressure as shown by the step increase in the commanded pressure value of curve 94. As noted hereinbefore, by commanding a maximum pressure value during the fill phase, the torque transmitting mechanism apply chamber may be quickly filled. However, as illustrated by the curve 90, the main pressure will drop as a result of the large fluid demands of the on-coming torque transmitting mechanism. The control pressure, represented by curve 92, will decrease in response to the drop in the main pressure value. The lowered main and control pressure values will cause the VBS valve 65 and 65' that is in the hydraulically off condition to leak as illustrated by curve 98.

At a time value equal to $t_1$, the fill phase is ended and the trim phase begins. The commanded pressure signal from the ECU 66 drops to an intermediate pressure value as shown by the step change of the curve 94 at $t_1$. As a result of the continued VBS valve leakage, demonstrated by curve 98, the main pressure and control pressure has a long "lag time", represented by L in FIG. 2, to recover. This "lag time" is shown as the difference in time between $t_2$ and $t_1$. During this "lag time", the stability of the on-coming pressure signal to the on-coming torque transmitting mechanism is compromised, as demonstrated by the curve 96 between $t_1$, and $t_2$. When the main pressure value and the control pressure value reach a high enough value to stabilize the VBS valve 65 and 65' that is commanded hydraulically on, the leakage from the VBS valve 65 and 65' that is commanded hydraulically off will abate and the on-coming pressure will stabilize for the remainder of the trim phase, as shown by curve 96 between $t_2$ and $t_3$. At a time equal to $t_3$ the ECU 66, requests full commanded pressure thereby providing full engagement of the torque transmitting mechanism. The instability of the on-coming pressure between $t_1$ and $t_2$ as a result of the "lag time" may result in poor engagement of the torque transmitting mechanism.

Figure 3:
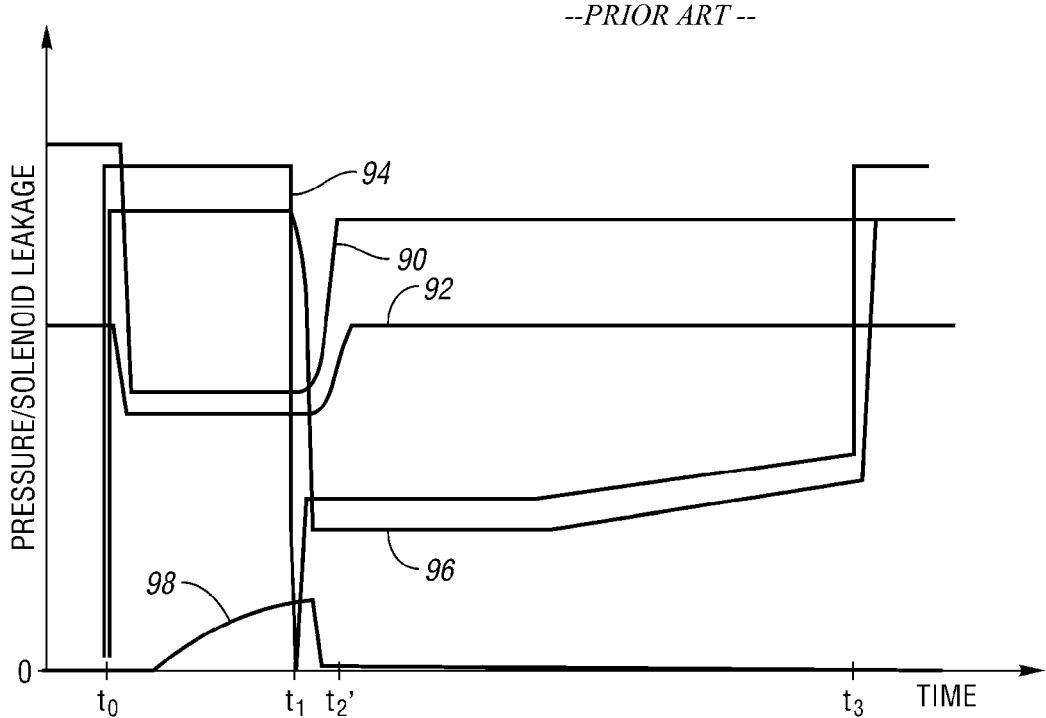
FIG. 3 is graphical representation of an on-coming torque transmitting mechanism engagement control strategy illustrating a method consistent with the present invention.

FIG. 3 is a graphical representation of a torque transmitting mechanism engagement strategy consistent with the method of the present invention. FIG. 3 can best be understood with reference to FIG. 1. At a time equal to $t_0$, the fill phase initiates and the ECU 66 commands one of the VBS valves 65 or 65' to a maximum commanded pressure as shown by the step increase in the commanded pressure value of curve 94. As noted hereinbefore, by requesting a maximum commanded pressure value during the fill phase, the torque transmitting mechanism apply chamber may be quickly filled. However, as illustrated by the curve 90, the main pressure value will drop as a result of the large fluid demands of the on-coming torque transmitting mechanism. The control pressure, represented by curve 92, will decrease in response to the drop in the main pressure value. The lowered main and control pressure values will cause the VBS valves 65 and 65' within the control system 44 that are in the hydraulically off condition to begin to leak as illustrated by curve 98.

At a time value equal to $t_1$, the fill phase is ended and the trim phase begins. The commanded pressure signal from the ECU 66 drops to a minimum value of approximately zero for a predetermined time and is then increased to an intermediate pressure value, as shown by the curve 94 between $t_1$ and $t_2$'. By requesting approximately zero commanded pressure or substantially disallowing pressurized fluid flow to the torque transmitting mechanism for a predetermined amount of time, the main pressure and control pressure may recover with a reduced or shorter "lag time" over that "lag time" L which is shown in FIG. 2. This "lag time" is shown in FIG. 3 as the difference in time between $t_2$' and $t_1$. As a result of this reduced "lag time", the stability of the on-coming pressure signal communicated to the on-coming torque transmitting mechanism is stabilized, as demonstrated by the curve 96 between the $t_1$ and $t_2$'. Additionally, the reduced "lag time" allows the main pressure value and the control pressure value to reach a value sufficiently large enough to stabilize the VBS valve 65 and 65' that is leaking, the leakage from the VBS 65 and 65' valve will abate shortly after $t_1$. At approximately $t_2$', an intermediate pressure is commanded to trim the torque transmitting mechanism into a controlled engagement. The on-coming pressure will remain stable throughout the trim phase, as shown by curve 96 substantially between $t_2$' and $t_3$. At a time equal to $t_3$, the ECU 66 requests full commanded pressure thereby providing full engagement of the torque transmitting mechanism. The stability of the on-coming pressure between $t_1$, and $t_3$ as a result of the reduced "lag time" will result in smooth engagement of the torque transmitting mechanism.

Figure 4:
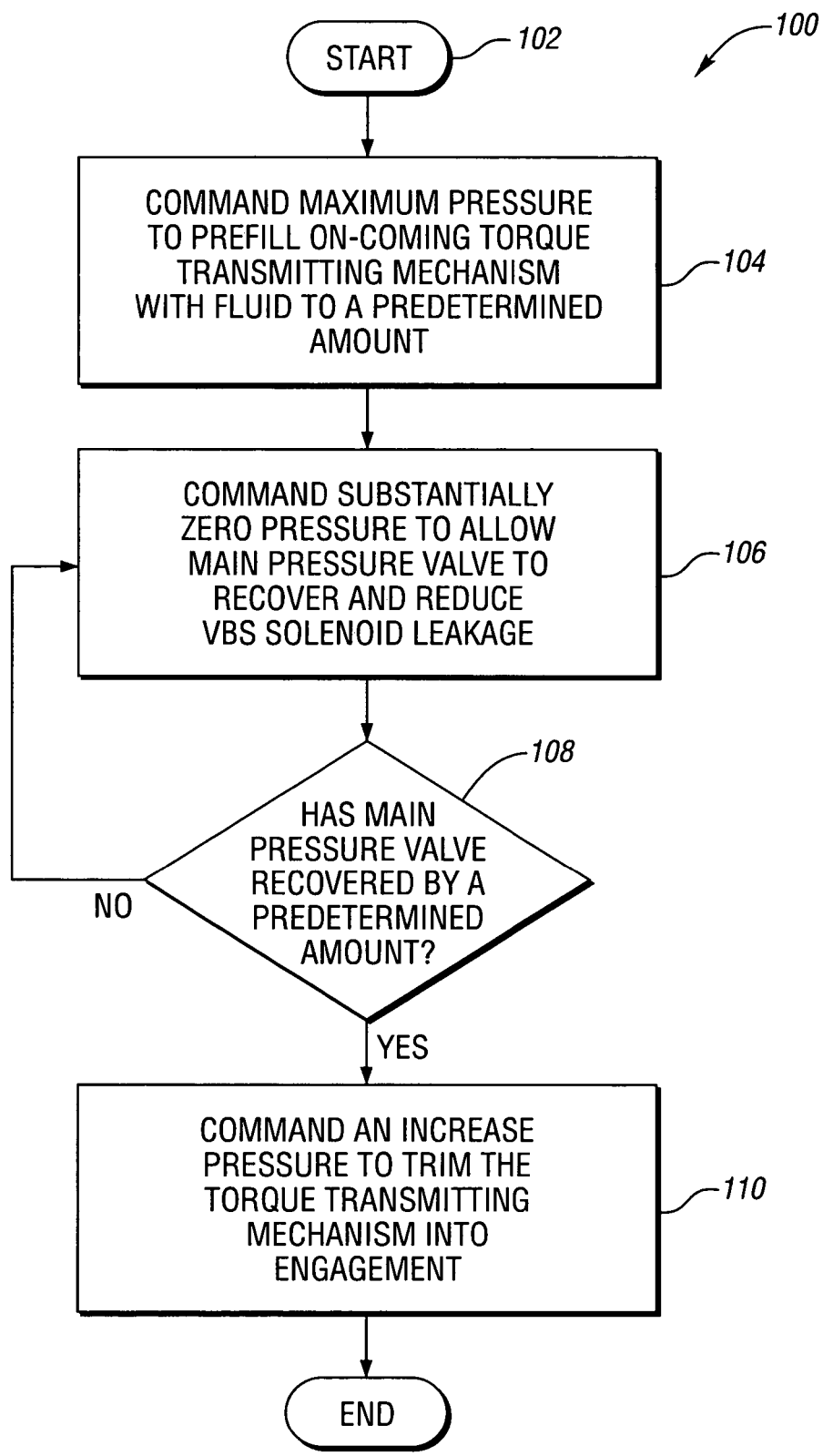
FIG. 4 is graphical representation in flowchart format illustrating the on-coming torque transmitting mechanism engagement method consistent with the present invention.

FIG. 4 depicts a method 100 of engaging an on-coming torque transmitting mechanism, such as C1, C2, C3, C4 or C5 of FIG. 1. The method 100 can best be described with reference to FIG. 1. The method is initiated at step 102.

At step 104, the ECU 66 commands one of the VBS valves 65 and 65' to control a respective trim valve 63 and 63' to provide maximum on-coming pressure to the on-coming torque transmitting mechanism. This step is referred to hereinabove as the fill phase. The maximum pressure value is commanded for a predetermined amount of time and will vary depending on the volume of the apply chamber of the on-coming torque transmitting mechanism, the main pressure value, the fluid temperature, etc. The fill time may be determined through modeling analysis or directly through experimentation. At the completion of the fill phase, the method 100 proceeds to step 106.

At step 106, the ECU 66 will request substantially zero commanded pressure, thereby allowing the main pressure value to increase and to stabilize any of the VBS valves within the control system 44 that may be leaking. The method 100 then proceeds to step 108.

At step 108 the ECU 66 determines whether the main pressure value has recovered by a predetermined amount. This may be done using pressure sensors within the passage 52 or by some other method known to those skilled in the art. If the main pressure value has not recovered by a predetermined amount, the method 100 will loop to step 106, alternately the method 100 will proceed to step 110.

At step 110, the ECU 66 requests an increased commanded pressure to trim the on-coming torque transmitting mechanism into engagement. By following this method of torque transmitting mechanism engagement, smooth engagements may be attained without the need to increase the capacity of the pump 46 to maintain the main pressure the efficiency of the powertrain 10.

While the best modes for carrying out the invention have been described in detail, those familiar with the art to which this invention relates will recognize various alternative designs and embodiments for practicing the invention within the scope of the appended claims.

The invention claimed is:

1. An electro-hydraulic control system for an automatically shiftable transmission comprising:
    at least one variable bleed solenoid valve operable to selectively provide pressurized fluid to selectively engage at least one torque transmitting mechanism;
    an electronic control unit operable to control said at least one variable bleed solenoid valve, wherein said electronic control unit is sufficiently programmed to control said at least one variable bleed solenoid to provide said pressurized fluid at a high pressure level to said at least one torque transmitting mechanism for a first predetermined time and subsequently to substantially disallow said pressurized fluid to said at least one torque transmitting mechanism for a second predetermined time subsequent to said first predetermined time;
    a main source of pressurized fluid wherein said main source of pressurized fluid provides said pressurized fluid to said at least one variable bleed solenoid valve; and
    wherein said electronic control unit is sufficiently programmed to determine a time required to stabilize said main source of pressurized fluid after said first predetermined time and to substantially equate said time required to stabilize said main source of pressurized fluid to said second predetermined time.

2. The electro-hydraulic control system of claim 1, wherein said at least one variable bleed solenoid modulates at least one pressure regulator valve, said pressure regulator valve being operable to selectively and variably provide said pressurized fluid to selectively engage said at least one torque transmitting mechanism.

3. The electro-hydraulic control system of claim 1, wherein said control unit is sufficiently programmed to further control said at least one variable bleed solenoid to provide said pressurized fluid at a lower pressure level to said at least one torque transmitting mechanism for a third predetermined time subsequent to said second predetermined time.

4. A method of controlling the engagement of a fillable torque transmitting mechanism comprising:
    providing at least one variable bleed solenoid valve operable to selectively provide pressurized fluid at various pressure values to selectively engage the torque transmitting mechanism;
    commanding said at least one variable bleed solenoid valve to a maximum pressure value for a first predetermined time to substantially fill the fillable torque transmitting mechanism;
    subsequently commanding said at least one variable bleed solenoid valve to a minimum pressure value for a second predetermined time;
    providing a main source of pressurized fluid;
    determining a time required to stabilize said main source of pressurized fluid after said first predetermined time; and
    substantially equating said time required to stabilize said main source of pressurized fluid to said second predetermined time.

5. The method of claim 4 further comprising:
commanding said at least one variable bleed solenoid valve to an intermediate pressure value for a third predetermined time to trim the fillable torque transmitting mechanism into engagement.

6. The method of claim 5 further comprising:
commanding said at least one variable bleed solenoid valve to a maximum pressure value subsequent to said third predetermined time to fully engage the fillable torque transmitting mechanism.

7. A method of controlling an automatically shiftable transmission having a hydraulically actuated fillable torque transmitting mechanism, the method comprising:
providing at least one variable bleed solenoid valve operable to selectively provide pressurized fluid to selectively engage the hydraulically actuated fillable torque transmitting mechanism;
commanding said at least one variable bleed solenoid valve to a maximum pressure value for a first predetermined time to substantially fill the hydraulically actuated fillable torque transmitting mechanism;
subsequently commanding said at least one variable bleed solenoid valve to a minimum pressure value for a second predetermined time;
commanding said at least one variable bleed solenoid valve to an intermediate pressure value for a third predetermined time to trim the hydraulically actuated fillable torque transmitting mechanism into engagement;
providing a main source of pressurized fluid;
determining a time required to stabilize said main source of pressurized fluid after said first predetermined time; and
substantially equating said time required to stabilize said main source of pressurized fluid to said second predetermined time.

8. The method of claim 7 further comprising:
commanding said at least one variable bleed solenoid valve to a maximum pressure value subsequent to said third predetermined time to fully engage the hydraulically actuated fillable torque transmitting mechanism.

\* \* \* \* \*